Sept. 1, 1953            R. W. KETCHLEDGE            2,650,991
ACCELEROMETER

Filed Nov. 14, 1947                                                2 Sheets-Sheet 1

INVENTOR
R. W. KETCHLEDGE
BY
D. MacKenzie
AGENT

Sept. 1, 1953 R. W. KETCHLEDGE 2,650,991
ACCELEROMETER
Filed Nov. 14, 1947 2 Sheets-Sheet 2
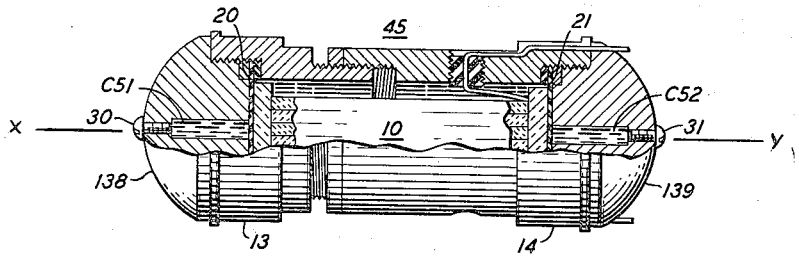
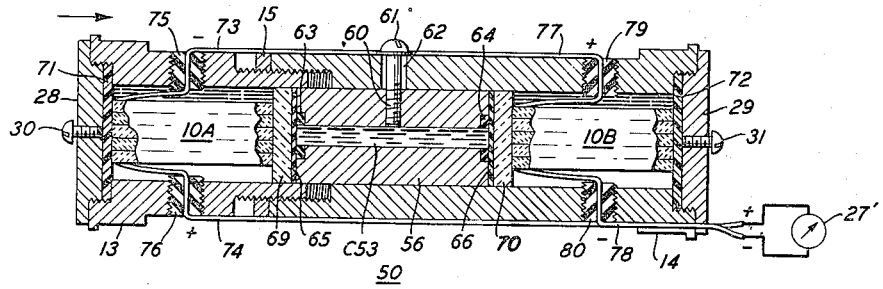
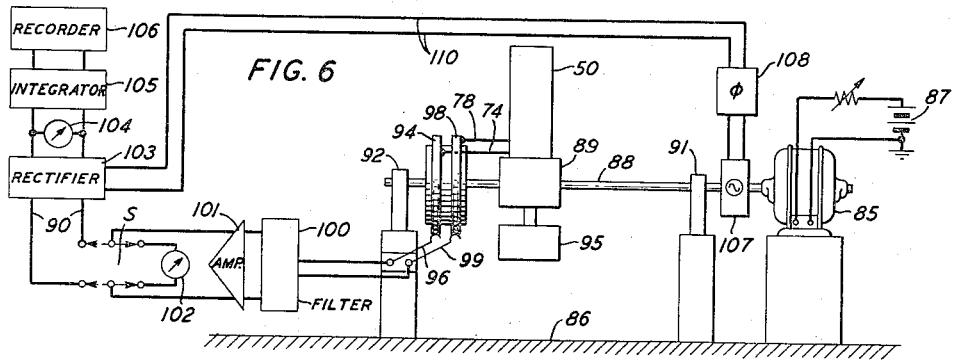
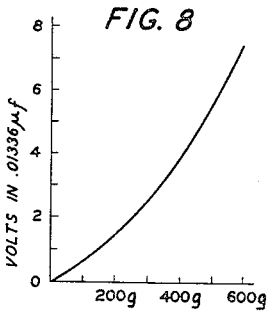
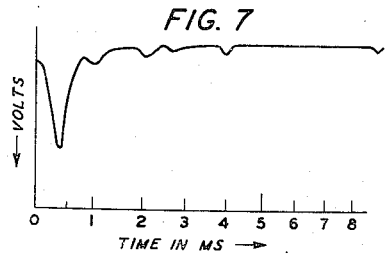
INVENTOR
R. W. KETCHLEDGE
BY
D. MacKenzie
AGENT Patented Sept. 1, 1953

2,650,991

UNITED STATES PATENT OFFICE 2,650,991

ACCELEROMETER

Raymond W. Ketchledge, Jamaica, N. Y., assignor to Bell Telephone Laboratories, Incorporated, New York, N. Y., a corporation of New York Application November 14, 1947, Serial No. 785,928

10 Claims. (Cl. 310—8.7)

This invention relates to an improved accelerometer, in which the acceleration-responsive element is a liquid. In various embodiments, the invention makes possible the measurement of accelerations or shocks in a line, in a plane or in any direction.

The general object of the invention is to provide an improved accelerometer.

One application of the invention is to the measurement of shocks experienced by a submarine cable in the process of laying. An object of the invention is therefore to provide means for acquiring important data concerning submarine cable installations.

The accelerometer of the present invention is responsive to abrupt shocks, or rapidly varying accelerations. Another object then is to provide an accelerometer capable of measuring transient disturbances.

The liquid element may be confined within chambers of any desired shape, and this may be chosen to make the response either directionally selective or non-directional. In particular, a form which makes the accelerometer responsive to acceleration along a specified direction in the instrument may be used in the measurement of gravity. An apparatus is disclosed capable of making this measurement, which may be done at sea or in the air (assuming a stable horizontal platform available) as well as in a fixed laboratory. To provide such apparatus is also an object of the invention.

Other objects include the provision of a novel form of seismograph for use in earthquake observations or in geographical exploration.

The invention will be understood from the following description with reference to the accompanying drawings in which:

Fig. 4 is a diagram of a "line-responsive" accelerometer;

Fig. 5 shows a line-responsive accelerometer distinguishing left from right shocks;

Figure 1:
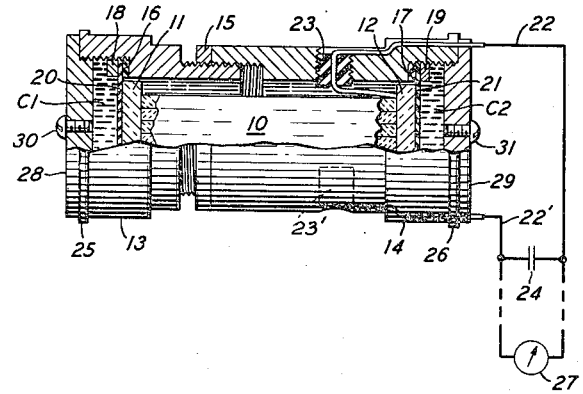
Fig. 1 shows in longitudinal section a "plane-responsive" embodiment of the invention suitable for submarine cable tests.

Fig. 6 diagrammatically represents an apparatus employing the accelerometer of Fig. 4 to measure gravity;

Fig. 7 is a specimen response of the accelerometer of Fig. 1; and

Fig. 8 is a calibration curve of a plane-responsive accelerometer.

In all figures, like numerals designate like elements.

Referring to Fig. 1, numeral 10 designates generally an array of piezoelectric crystals, described in greater detail in connection with Fig. 2, by which a change in liquid pressure resulting from an acceleration is translated into an electrical voltage related to that change. To the array 10 are glued, one at each end thereof, the ceramic discs 11, 12. These, and other elements of the assembly, are housed in a cylindrical core made up of the two sleeves 13 and 14, sleeve 13 being externally threaded to be secured into internally threaded sleeve 14. An internally threaded clamping ring 15 preserves the desired lengthwise relationship of sleeves 13 and 14.

The internal surfaces of sleeves 13 and 14 are prolongations of each other, and smoothly fitting within them are the discs 11 and 12. The end portions of sleeves 13 and 14 are each internally cut out to leave a shoulder which is adjusted to be nearly flush with the outer face of the corresponding ceramic disc. The end portions so cut out are internally threaded so that neoprene gaskets 16 and 17, surrounding discs 11 and 12, respectively, may be assembled with their outer surfaces flush with the like faces of the discs, and held firmly so by clamping rings 18, 19. Between gasket 16 and clamping ring 18 is tightly held a diaphragm 20 of stainless steel or rubber which is in firm contact with the outer face of disc 11; diaphragm 21 is similarly held between gasket 17 and ring 19 and in firm contact with the outer face of disc 12.

Leads 22, 22' are brought from crystal array 10 through holes in insulating plugs 23, 23' threaded into radial holes in sleeve 14, thence via any desired path (for simplicity, notches) through sleeve 14 and plug 29 for connection to a measuring circuit. For a reason later stated, leads 22, 22' are shunted by a condenser 24, beyond which they may be carried for a great distance to a voltage measuring device, symbolized by voltmeter 27.

While a piezoelectric crystal is preferred as the pressure-responsive element, other such elements may serve in the present invention. For example, use may be made of the magnetostriction of nickel, a permanently magnetized nickel tube may be held under slight initial lengthwise compression between discs 11 and 12 and surrounded by a coil terminating in leads 22, 22'. When the compression of the rod changes, a corresponding voltage is induced in the coil. Other pressure-sensitive elements will occur to those acquainted with the art.

Sleeves 13 and 14 are turned with external shoulders as indicated in Fig. 1, terminating in shoulders 25 and 26, of diameter suitable to fit snugly within a submarine cable sheath. At the left end of the accelerometer a cylindrical cavity of radius R and depth $t$ is formed bounded by diaphragm 20 and by a steel closing plug 28. Plug 28 is turned with a threaded shoulder which is screwed into the internally threaded end portion of sleeve 13, lengthwise of the instrument, to leave the desired depth $t$ between the opposing faces of diaphragm 20 and plug 28. A similar plug 29 closes the right-hand end of the instrument. Small holes, tapped in each plug, are closed when the assembly is complete by tightly fitting screws 30 and 31.

All of the joints and surfaces of contact are sealed with any appropriate substance, such as an automobile gasket cement. The crystal array is supported by any convenient means (not shown) within sleeves 13 and 14.

The cavity between each closing plug and the diaphragm facing it is filled completely with a liquid, preferably mercury, carefully freed of air, and screws 30, 31 are installed, completing the assembly of the accelerometer.

It will now appear that crystal array 10 is bounded at each end by a disc-shaped pool of mercury with which it is in mechanical contact so that changes in hydrostatic pressure in the mercury are enabled to produce, in well-known manner, corresponding crystal voltages which may be read on meter 27. The mercury "disc" lies at right angles to the length of the crystal array, its thickness $t$ being small compared to its radius R.

The theory of operation of the instrument is based on the familiar fact that at the bottom of a column of liquid of height H and density P the hydrostatic pressure is PgH, where $g$ is the acceleration of gravity. If such a column is subjected to any other acceleration G, the pressure becomes PGH, and this effect is produced in a horizontal column of length H exposed to a horizontal acceleration. In each case, the dimension in the direction of the acceleration determines the resulting pressure at the near end of the column in that direction; the bottom when the column is of height H and the acceleration overcomes gravity; the left end of a horizontal column of length H when the acceleration is directed to the right in a horizontal line.

The pressure in such a column varies from zero at one end to a maximum at the other end, with an average value half way along the column equal to one-half PGH. A pressure-responsive device, mechanically subjected to the pressure along the entire length of the column, will respond to this average pressure. In the case of the accelerometer of Fig. 1, the average pressure for an acceleration at right angles to the length of the crystal array is PGR, where R is the radius of the mercury "disc," G the acceleration in the plane of the disc, and R the radius of the disc.

While there is a response of similar character to an acceleration in the direction across the plane of the disc, the small value of $t$ means that the generated pressure is much smaller than that produced by an acceleration along the plane (that is, at right angles to the length of crystal array 10) and the instrument substantially ignores a longitudinal thrust.

The symmetry of the apparatus and of the liquid cells results in a response to acceleration in a plane parallel to the plane of the mercury-filled cavities, but without discrimination of radial direction in this plane. The device of Fig. 1 is therefore plane-responsive, and when it is mounted in a cable sheath it responds to sidewise shocks. This is the desired response in that application of the invention.

In an actual instrument as in Fig. 1 for measuring cable shocks, the over-all length between screws 30 and 31 was 3¼ inches, the radius R of the mercury chamber ½ inch, and the distance $t$ was 1/16 inch. The outside diameter of the shoulders 25, 26 was 1½ inches, and the crystal array was about 2 inches long with a cross-section ½ inch square.

The piezoelectric elements are preferably ammonium dihydrogen phosphate crystals such as are described by W. P. Mason in an article entitled "The elastic, piezoelectric and dielectric constants of potassium dihydrogen phosphate and ammonium dihydrogen phosphate," published in 1946 in the Physical Review, 2nd series, vol. 69, pages 173–194. The 45-degree Z-cut is preferred.

Figure 2:
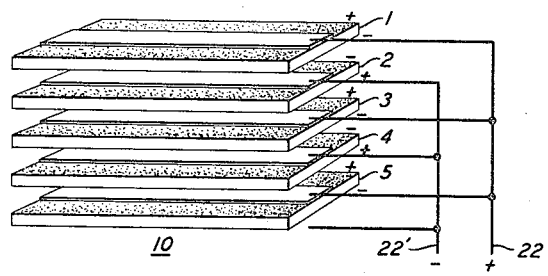
Fig. 2 is a perspective view of the piezoelectric crystal array preferably used in all forms of the invention.

Referring now to Fig. 2, five slabs so cut from the original crystal, shown in separation, are indicated by the numerals 1 to 5. Each slab is conveniently 2"x0.5"x0.1", and is lightly coated with gold on both upper and lower surfaces. When such a slab is compressed in the direction of its length, a positive charge appears on one of these surfaces, a negative charge on the other. The slabs are so assembled that the facing surfaces of slabs 1 and 2 and of slabs 3 and 4 acquire under compression a charge of the same polarity, while a charge of the opposite polarity is acquired by the facing surfaces of slabs 2 and 3 and of 4 and 5. The lower face of slab 5 is changed to the former, while the upper face of slab 1 is changed to the latter, polarity. Between the facing surfaces, and above slab 1 and below slab 5, are placed narrow thin strips of gold which are connected in two groups as shown in Fig. 2 to leads 22, 22'. The five slabs are then cemented together and the two leads are drawn through insulating bushings 23, 23' to the outside through closing plug 29. The total capacity of the crystal assembly is about 160 micromicrofarads.

The instrument is then assembled, cavities $C_1$ and $C_2$ are filled with mercury, and a calibration is made. For this purpose the capacity of condenser 24 is about 0.01 microfarad. The accelerometer is fixed on a table of weight W and accelerometer and table are dropped through a height $h$ to be arrested and thrown back by a spring of stiffness $k$. The velocity of the accelerometer when it strikes the spring is $\sqrt{2gh}$, where $g$ is the acceleration of gravity, and it may be shown that the spring exerts a maximum force on the instrument corresponding to an acceleration (reversal of motion)

$$a = \sqrt{\frac{2kh}{W}}$$

It is found that a voltage of about 2 volts appears across condenser 24 when the calculated value of $a$ is 100$g$. Were condenser 24 omitted, the voltage between leads 22, 22' would be some sixty times this; the inherent response is thus about 125 volts per 100g. In cable laying, shocks of the order of 500g are expected.

The inclusion of shunt condenser 24 is desirable because at 100 cycles per second the capacity (160 micromicrofarads) of crystal 10 corresponds to an impedance of 10 megohms, and it is desirable to reduce this to the order of 100,000 ohms. If condenser 24 is of capacity 0.016 microfarad, its impedance at 100 cycles per second is 100,000 ohms and the voltage produced is then only 1 per cent of that between leads 22, 22' without the condenser. Since the response is a sharp voltage pulse, further reduction by a transformer, stepping down the impedance to 50 ohms, is desirable when long leads are to be led from the ocean floor to the water surface; this would result in a voltage input to the cable containing leads 22, 22' of about 0.3 volt, representing about one milliwatt of power, when the acceleration to be measured is 2,000 times gravity.

The operating principle of the accelerometer shown in Fig. 1 may be applied in a non-directional instrument as well. It will be recalled that the cavities $C_1$ and $C_2$ of Fig. 1 are disc-shaped, and the sensitivity is much less for lengthwise than for sidewise shocks because the corresponding "depth" of liquid is less. By making the cavities hemispherical, the depth is made uniform over the whole hemisphere at each end of the accelerometer.

Figure 3:
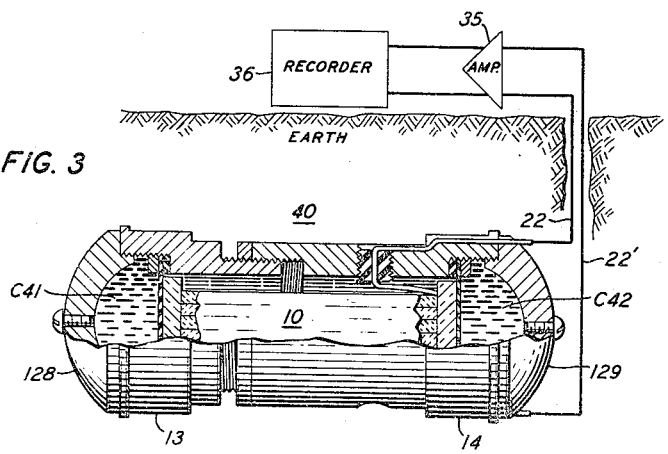
Fig. 3 shows in skeleton view a spherically-responsive accelerometer.

In Fig. 3 is shown a spherically responsive liquid accelerometer 40 in which the closing plugs 128 and 129, defining cavities $C_{41}$ and $C_{42}$ of radius R, are hemispherical. In all other details the instrument of Fig. 3 is identical with that shown in Fig. 1. It will be understood that the dimensions may differ as desired from those illustratively stated in describing Fig. 1; particularly the radius of the mercury hemispheres may be increased, thereby increasing the response in the same ratio. Fig. 3 shows the non-directional accelerometer embedded in the earth. Leads 22, 22' are brought to the earth's surface and connected to the input of a conventional amplifier 35 to the output of which is connected any suitable recorder 36. The system of apparatus shown in Fig. 3 thus constitutes a non-directional seismograph capable of responding to earth shocks in any direction; mounted in a surface observatory it can do the work of prior art seismographs of like function.

In many applications, it is desired to measure shocks in a particular line, say along the length of the accelerometer, discriminating or not between shocks in opposite senses along that line. The invention may be readily embodied in "line-responsive" apparatus with or without such discrimination.

In Fig. 4 is shown a line-responsive accelerometer 45, modified from the design of Fig. 1 in the shape of the liquid element. Here plugs 138 and 139 are hemispheres (or cylinders) seating snugly against diaphragms 20 and 21, respectively. Plugs 138 and 139 are solid except for lengthwise cylindrical bores of small diameter, $C_{51}$ and $C_{52}$, extending below closing screws 30 and 31 to the diaphragm surface. Cavities $C_{51}$ and $C_{52}$ are filled with mercury; their length may be R, the same as the radius of the hemispherical cavities $C_{41}$, $C_{42}$ of Fig. 3. Such an accelerometer responds to accelerations in the line X—Y without regard to whether shocks are from X toward Y or reversely. Except for the shape of the mercury-filled cavities, the instrument may be of like design to that of Fig. 1. To make accelerometer 45 capable of distinguishing right from left shocks, $C_{51}$ (say) is left empty, diaphragm 20 is made rigid and an initial pressure is created in cavity $C_{52}$. A more sensitive device of this character is shown in Fig. 5.

The same principle, with appropriate departure in design, is applied in the discriminating line-responsive instrument diagramed in Fig. 5, and generally designated by numeral 50.

Referring now to Fig. 5, the general form of the enclosing case is the same as that of the instrument shown in Fig. 1. In Fig. 5, however, a pair of crystal arrays 10A and 10B mounted internally and lengthwise of the sleeves 13 and 14, are separated by a lengthwise column of mercury, filling cavity $C_{53}$ in steel cylinder 56 which fits snugly within sleeves 13 and 14. Cylinder 56 is provided with a threaded filling hole 60, closed after filling with plug 61, which is inserted through hole 62 drilled radially through sleeve 14. Crystals 10A and 10B are similar in construction to crystal 10 of Fig. 1.

Cylinder 56 is turned internally at each end to receive the annular gaskets 63, 64. After assembly of the instrument, the end surfaces of cylinder 56 are flush with the outer surfaces of gaskets 63 and 64, and against these surfaces are provided rubber diaphragms 65 and 66, in contact as in the accelerometer of Fig. 1 with ceramic discs 69 and 70, respectively, through which the hydrostatic pressure in the liquid filling cavity $C_{53}$ is effective on the respectively adjacent ends of crystals 10A and 10B to which the ceramic discs are glued as before described. At their ends remote from the discs, the crystals are glued to discs 71, 72, say of plastic material, beyond which are end plugs 28 and 29, the same as in Fig. 1. Plugs 28 and 29 are centrally tapped to receive screws 30 and 31, respectively, by means of which the crystals are given any desired initial compression after assembly of the instrument.

Leads 73, 74 for crystal 10A are taken through insulating bushings 75, 76 in sleeve 13; for crystal 10B, leads 77, 78 pass through similar bushings 79, 80. The assembly of the instrument is obvious and is here unnecessary to describe.

The crystals have been given an initial compression by means of screws 30, 31 and lead 73 is connected to lead 77, while leads 74 and 78 are connected each to one terminal of zero center meter 27'. The charge developed by the initial compression rapidly leaks away through the meter 27'.

Let the crystals be each so poled that further lengthwise compression makes positive leads 74 and 77, negative leads 73 and 78; reduction in lengthwise compression reverses these polarities in each case. Let it be assumed that a shock, in the direction of the arrow in Fig. 5, is applied to the accelerometer. The result will be an increased hydrostatic pressure at the left end of cavity $C_{53}$, a decrease in the pressure at the right end thereof. The piezoelectric effect then, with leads 73 and 77 connected as shown, is to develop two voltages in series across meter 27'. Lead 74, connected to the upper terminal of meter 27', is positive; lead 78, connected to the lower terminal of the meter, is negative.

Obviously, if the shock is oppositely directed, the voltage across meter 27' is reversed. The meter deflection is therefore in one direction for a shock from left to right, in the opposite direction for a right-to-left shock.

The sensitivity of the accelerometer is proportional to the depth of the mercury pool in the direction of the acceleration. The instrument of Fig. 1, with a radius of 0.5 inch for the mercury disc, has a sensitivity of about 1 volt per g (condenser 24 omitted). With the design of Figs. 4 and 5, the pressure to which the crystal responds is that at the near end of the mercury column rather than the average pressure from end to end. Thus, with a 2.5-inch length for cavity $C_{53}$ of Fig. 5, about 5 volts/g would be obtained. One-millionth g, or one-thousandth of a centimeter per second squared, would provide 5 microvolts, a quantity readily amplified for convenient measurement. The application of the invention to the accurate measurement of gravity is possible on land, at sea or in the air, wherever a stable platform is available; for sea and air work, gyroscopic stabilization is disclosed, for example, in Patents 2,014,825, September 17, 1935, to J. P. Watson, and 1,840,104, January 5, 1932, to H. Anschuetz-Kaempfe.

Referring to Fig. 6, a system of apparatus for the measurement of gravity is schematically shown. Motor 85, supported on stable platform 86, is supplied with power from a source symbolized by battery 87 and rotates shaft 88 in bearings supported parallel to platform 86 by pillars 91 and 92. Between pillars 91 and 92, shaft 88 carries drum 89 which supports, at right angles to shaft 88, accelerometer 50 of Fig. 5 and counterweight 95. Slip rings 94 and 98, insulated from each other and from shaft 88, are mounted on the shaft at any convenient position and to them are connected, respectively, leads 74 and 78 from accelerometer 50.

It will be readily understood that the centrifugal force on the accelerometer is constant and gives rise to a steady voltage between leads 74, 78. Also, that the downward acceleration of gravity in one vertical position of accelerometer 50 is productive of an additional piezoelectric voltage which reverses sign when the accelerometer reaches the opposite vertical position. If $\rho$ is the density of mercury, $l$ the length of the mercury-filled cavity $C_{53}$ and $f$ the angular speed of shaft 88 in revolutions per second, there appears between leads 74, 78 an alternating voltage proportional to $\rho g l \sin 2\pi f t$, of phase dependent on the sense of rotation of shaft 88.

Making contact with slip rings 94, 98 are brushes 96, 99 respectively, which are connected to electrical filter 100 which is preferably tuned to the rotation frequency and so excludes the steady voltage due to centrifugal force, providing at its output only $\rho g l \sin 2\pi f t$, the generated alternating voltage. This output voltage, amplified by amplifier 101, is by switch S applied either to meter 102 or by leads 90 to rectifier 103.

The alternating voltage between leads 74, 78 is proportional in amplitude to the acceleration to be measured, but is of phase dependent upon the radial direction of the acceleration; the amplitude is the same whatever this radial direction, so the apparatus of Fig. 6 so far described is plane-responsive. To confine its response to a prescribed direction in the plane of rotation of accelerometer 50, it is necessary to compare the output voltage from amplifier 101 with a reference voltage of the same frequency but of fixed determinable phase.

Rectifier 103 must therefore be a phase-sensitive device, an example of such being the circuit disclosed in my Patent 2,439,273, granted January 13, 1948. The accelerometer voltage between leads 90 is compared in rectifier 103 with a reference voltage of the same frequency derived from generator 107 driven by shaft 88 and impressed through phase shifter 108 on rectifier 103 via leads 110. Generator 107 is of conventional design, and generates a voltage of fixed phase and of amplitude large compared with the accelerometer voltage. Phase shifter 108 is preferably of the type disclosed by H. Nyquist in Patent 1,717,400, granted June 18, 1929; it permits rotation, through any desired angle, of the phase of the voltage from generator 107. Both my patent above referred to and the patent to Nyquist are assigned to the same assignee as the present invention.

Phase shifter 108 may be adjusted to make the phase of the voltage on leads 110 correspond with any desired radius in the plane of rotation of accelerometer 50. There results at the output of rectifier 103 a unidirectional voltage proportional exclusively to the acceleration component along the selected radius and of polarity corresponding to the sense of the acceleration in that direction.

The adjustment of phase shifter 108 thus makes the system of Fig. 6 line-responsive in any desired direction lying in the plane perpendicular to the axis of shaft 88.

When gravity is the quantity to be measured, its direction is known beforehand to be downward and the phase of the alternating voltage is immaterial. Therefore, meter 102 may be a conventional alternating current voltmeter.

It should be recognized that platform 86, shown horizontal in Fig. 6, may be vertical as well. If shaft 88 is mounted to rotate in a vertical position, and the sense of rotation is fixed, the apparatus of Fig. 6 is adapted to measure the horizontal acceleration of a vessel carrying it. For this purpose, switch S is thrown to supply the output voltage of amplifier 101 to rectifier 103. The output voltage of rectifier 103 may be read, if desired, on direct current voltmeter 104; it is positive, say, for acceleration forward, negative for the reverse acceleration. Obviously, this rectified output voltage may be applied to an integrating circuit 105. Circuit 105 may, for example, be an RC circuit such as is shown in Patent 2,099,536, November 16, 1937, to S. A. Scherbatskoy et al.; it delivers to recorder 106 a voltage proportional to the time integral of the voltage output from accelerometer 50, and so proportional to the time integral of the acceleration, i. e., to the horizontal velocity of the vessel.

The combination of a plurality of such apparatus as shown in Fig. 6, with shafts rotating about mutually perpendicular axes, of course permits the determination of the corresponding velocity components. Accelerometer 45 of Fig. 4, modified as described for left-right discrimination, may replace accelerometer 50 in the system of Fig. 6.

The trace shown in Fig. 7 represents, with equal vertical and horizontal enlargement, a photograph of the response of an accelerometer as in Fig. 1 to a shock of about 400 g, displayed on a cathode ray oscilloscope screen. Time in milliseconds starts with the beginning of the sweep simultaneously with the moment of impact of the recorded shock. To reduce the peak voltage to about 1 volt, the capacity of condenser 24 was about 0.064 microfarad.

Fig. 8 shows a calibration curve, obtained as previously described, of an instrument of the type shown in Fig. 1. In obtaining this curve, a condenser of capacity about 0.01336 microfarad was shunted across the crystal; volts measured across the condenser are plotted vertically against computed accelerations. For other values of shunt capacity the voltage is inversely proportional thereto. The response is approximately parabolic through the lower range of shock amplitudes, by reason of the character of the compliance of the stainless steel diaphragm (20, Fig. 1); with a rubber diaphragm this effect is not present.

In all embodiments of the invention herein described, an initial hydrostatic pressure in the mercury produces a momentary voltage which rapidly vanishes if the instrument is undisturbed. Thus the voltage appearing in response to an acceleration is a function of the increment of hydrostatic pressure produced by the acceleration.

What is claimed is:

1. An accelerometer comprising a rigid housing, a pressure-responsive element, means for supporting the element within the housing including a rigid disc affixed to the element, a flexible diaphragm peripherally secured internally to the housing and centrally abutting the disc, a rigid closure for the housing spaced from the diaphragm to provide a cavity between the closure and the diaphragm, a liquid mass filling the cavity and exerting hydrostatic pressure over the surface of the diaphragm and means for measuring the response of the element to change in said pressure.

2. An accelerometer comprising a rigid housing, a pressure-responsive element including means for generating an electrical voltage varying in magnitude with the pressure on the element, means for supporting the element within the housing including a rigid disc affixed to the element, a flexible diaphragm peripherally secured internally to the housing and centrally abutting the disc, a rigid closure for the housing spaced from the diaphragm to provide a cavity between the closure and the diaphragm, a liquid mass filling the cavity and exerting hydrostatic pressure on the diaphragm and means for measuring the voltage generated by the element responsively to change in said pressure.

3. An accelerometer comprising a rigid housing, a pressure-responsive element including a piezoelectric crystal, means for supporting the element within the housing including a rigid disc affixed to the element, a flexible diaphragm peripherally secured internally to the housing and centrally abutting the disc, a rigid closure for the housing spaced from the diaphragm to provide a cavity between the closure and the diaphragm, a liquid mass filling the cavity and exerting hydrostatic pressure over the surface of the diaphragm and means for measuring the response of the crystal to change in said pressure.

4. A plane-responsive accelerometer comprising a rigid cylindrical housing, rigid members closing the housing at each end, a piezoelectric crystal array within the housing and intermediate the closing members, a rigid disc affixed to each end of the array, flexible diaphragms peripherally secured internally to the housing and centrally securing the discs, thereby enclosing near each end of the housing a cylindrical cavity, a liquid mass filling each cavity and means for measuring the response of the crystal to change in pressure thereon.

5. A spherically responsive accelerometer comprising a hollow rigid housing, a pair of rigid hemispherical members closing the housing at opposite ends thereof, a pair of rigid discs transversely supported within the housing and in spaced parallel relationship internally of the closing members, thereby with said members enclosing a hemispherical cavity at each end of the housing, an electrical generator connected between and controlled by said discs and a mass of liquid filling each cavity.

6. A line-responsive accelerometer comprising a rigid shell, a pair of rigid members closing the shell at opposite ends of an axis thereof, each closing member being perforated by an elongated channel lengthwise of said axis, plugs closing externally each of said channels, a rigid plate resiliently supported within the shell internally adjacent each closing member thereby defining in each of said members a longitudinal cavity, a mass of liquid filling each cavity and an electrical generator controlled by the plates to generate voltages responsively to variations in hydrostatic pressure in the liquid masses.

7. A line-responsive accelerometer comprising a rigid cylindrical housing, rigid members closing the housing at each end, a rigid cylindrical member provided with an axial bore and positioned in the housing intermediate the closing members, a flexible diaphragm peripherally secured in the housing at each end of the cylindrical member to close the bore therein, a rigid plate in contact with each diaphragm, a liquid mass filling the bore, a pair of piezoelectric crystals secured within the housing individually between the plates and the adjacent closing members, said crystals being electrically connected in series, and means for indicating the sense and magnitude of the response of the connected crystals to change in pressure in the liquid mass.

8. An accelerometer comprising a rigid housing, a pressure-responsive element, means for supporting said element within said housing, a rigid disc affixed to said element, a flexible diaphragm peripherally secured internally to the housing and centrally abutting said disc, a rigid closure for said housing, said closure being so disposed with respect to said diaphragm that a cavity is provided therebetween, a liquid mass filling the cavity and exerting hydrostatic pressure over the surface of said diaphragm, said rigid closure member being channeled and provided with a plug adjustable in the channel externally of said housing to produce an initial compression of said pressure-responsive element, and means for measuring the response of said pressure-responsive element to change in pressure.

9. An accelerometer comprising a hollow cylindrical housing, a pressure-responsive element supported within said housing, a rigid disc affixed to each end of said element, a flexible diaphragm located at each end of said element, each said diaphragm being peripherally secured internally to said housing and centrally abutting one of said discs, a rigid closure member for each end of said housing, each of said closure members being spaced from one of said diaphragms to provide a cavity between said closure and said diaphragm at each end of said housing, a liquid mass filling each cavity and exerting hydrostatic pressure on said diaphragms, means for measuring the voltage generated by said pressure-responsive element responsive to change in pressure and adjustable means provided in each of said closure members for producing a predetermined initial compression of said pressure-responsive element following assembly of said accelerometer.

10. An accelerometer in accordance with claim 9 in which the adjustable means in each of said closure members comprises a channel in said closure member provided with a plug adjustable in its associated channel externally of said housing.

RAYMOND W. KETCHLEDGE.

References Cited in the file of this patent

UNITED STATES PATENTS

| Number | Name | Date |
|---|---|---|
| 1,317,072 | Carlier | Sept. 23, 1919 |
| 2,138,036 | Kunze | Nov. 29, 1938 |
| 2,193,910 | Wilson | Mar. 14, 1940 |
| 2,371,626 | Kecskemeti | Mar. 20, 1945 |
| 2,391,966 | Harrison | Jan. 1, 1946 |
| 2,406,767 | Hayes | Sept. 3, 1946 |
| 2,411,401 | Welch | Nov. 19, 1946 |
| 2,417,426 | Mason | Mar. 18, 1947 |
| 2,448,365 | Gillespie | Aug. 31, 1948 |
| 2,454,264 | Stigter | Nov. 16, 1948 |
| 2,487,035 | Weaver | Nov. 1, 1949 |
| 2,498,737 | Holden | Feb. 28, 1950 |
| 2,514,297 | Smith | July 4, 1950 |

FOREIGN PATENTS

| Number | Country | Date |
|---|---|---|
| 692,497 | Germany | June 20, 1940 |
| 772,835 | France | Aug. 20, 1934 |

OTHER REFERENCES

French publication "Le Genie Cival," April 25, 1925, page 409, Fig. 19.